(12) United States Patent
Lee

(10) Patent No.: US 12,385,691 B2
(45) Date of Patent: Aug. 12, 2025

(54) REFRIGERATOR

(71) Applicant: LG ELECTRONICS INC., Seoul (KR)

(72) Inventor: Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 588 days.

(21) Appl. No.: 17/777,587

(22) PCT Filed: Sep. 23, 2020

(86) PCT No.: PCT/KR2020/012837
§ 371 (c)(1),
(2) Date: May 17, 2022

(87) PCT Pub. No.: WO2021/101056
PCT Pub. Date: May 27, 2021

(65) Prior Publication Data
US 2022/0412640 A1    Dec. 29, 2022

(30) Foreign Application Priority Data
Nov. 19, 2019    (KR) .................. 10-2019-0148354

(51) Int. Cl.
*G06V 20/68* (2022.01)
*F25D 23/02* (2006.01)
(Continued)

(52) U.S. Cl.
CPC ........... *F25D 29/00* (2013.01); *F25D 23/028* (2013.01); *G06Q 10/087* (2013.01); *G06V 20/52* (2022.01);
(Continued)

(58) Field of Classification Search
CPC .... F25D 29/00; F25D 23/028; F25D 2500/06; F25D 2400/361; F25D 2700/04;
(Continued)

(56) References Cited

U.S. PATENT DOCUMENTS 10,281,200 B2 *   5/2019   Johnston .............. G06T 7/0002
2015/0260449 A1 * 9/2015   Furuta .................... F25D 29/00
                                                                    62/125
(Continued)

FOREIGN PATENT DOCUMENTS

CN      204757536 U      11/2015
EP      3957938 A1       2/2022
(Continued)

*Primary Examiner* — Garcia Ade
(74) *Attorney, Agent, or Firm* — Bryan Cave Leighton Paisner LLP

(57) ABSTRACT

The present disclosure relates to a refrigerator and, specifically, to a shared refrigerator used by a plurality of users. An embodiment of the present disclosure may provide a refrigerator, a shared refrigerator system including same, and a control method thereof, the refrigerator including: a case which forms a storage compartment; a door provided at the case to open and close the storage compartment; an authentication unit provided at the case or the door to recognize an individual who opens and closes the door; a camera module for photographing the inside of the storage compartment in order to recognize an item provided inside the storage compartment; and a control unit for matching an ownership relationship between an item recognized through the camera module and an individual recognized through the authentication unit.

19 Claims, 9 Drawing Sheets

(51) Int. Cl.
  *F25D 29/00* (2006.01)
  *G06Q 10/087* (2023.01)
  *G06V 20/52* (2022.01)
  *G06V 40/10* (2022.01)
(52) U.S. Cl.
  CPC ............. *G06V 20/68* (2022.01); *G06V 40/10*
    (2022.01); *F25D 2500/06* (2013.01)
(58) Field of Classification Search
  CPC .. F25D 2700/06; F25D 29/005; F25D 29/008;
    G06Q 10/087; G06Q 50/10; G06V 20/52;
    G06V 20/68; G06V 40/10
  USPC .......................................................... 705/22
  See application file for complete search history.

(56) References Cited

U.S. PATENT DOCUMENTS

2018/0172343 A1    6/2018  Grimminger et al.
2019/0384990 A1*  12/2019  Kim .................... H04L 67/10

FOREIGN PATENT DOCUMENTS

JP       10316210 A    12/1998
JP      2014066407 A     4/2014
JP      2015069301 A     4/2015
KR    1020170029905 A    3/2017
KR    1020180100636 A    9/2018
WO   WO-2022217935 A1 * 10/2022  .............. F25B 29/00

* cited by examiner

FIG. 5

| Item No | Name | Count | Weight | Position | Owner | Authority grant |
|---|---|---|---|---|---|---|
| 1 | a | 1 | 50g | Right / $3^{rd}$ | A | |
| 2 | b | 1 | 300g | Right / $3^{rd}$ | A | B |
| 3 | ... | | | | | |

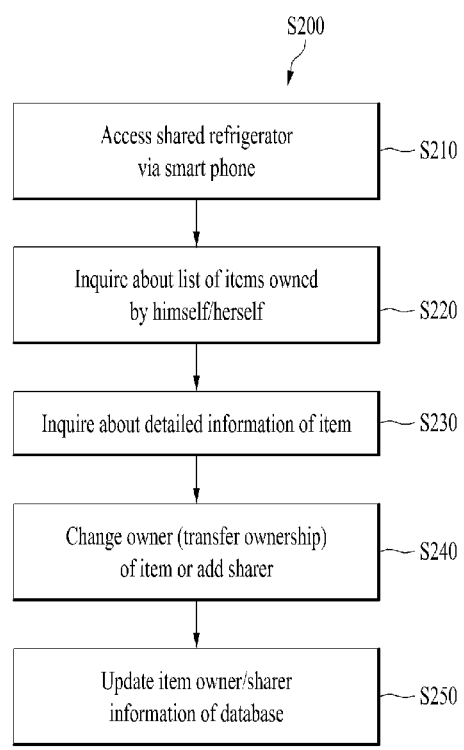

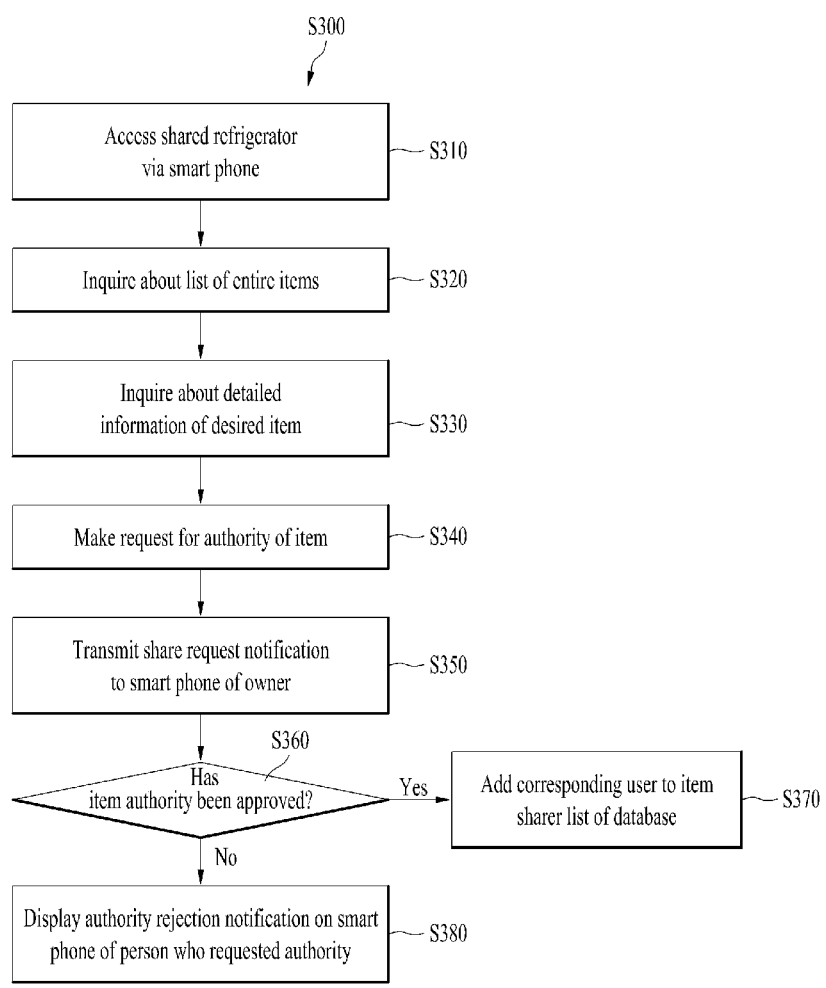

REFRIGERATOR

CROSS-REFERENCE TO RELATED APPLICATIONS

This application is a National Stage filing under 35 U.S.C. 371 of International Application No. PCT/KR2020/012837, with an international filing date of Sep. 23, 2020, which claims the benefit of KR Patent Application No. 10-2019-0148354, filed on Nov. 19, 2019, all of which are incorporated by reference in their entirety herein.

TECHNICAL FIELD

The present disclosure relates to a refrigerator, and more particularly, to a shared refrigerator used by a plurality of users.

BACKGROUND ART

In general, a refrigerator is an apparatus for refrigerating or freezing a stored product and is used in homes and businesses such as restaurants. The refrigerator is often used by family members or business members.

However, a plurality of users may share one refrigerator in a space used by the plurality of users, for example, in a space (hereinafter, referred to as a "shared space") such as an office, a hospital, a shared house, a dormitory, or a school. A refrigerator in which a plurality of storage chambers are defined in one refrigerator and a door individually disposed on each storage chamber may be provided. In this case, a plurality of users may use one storage chamber.

In case of such a shared refrigerator, an owner is determined for each stored product (hereinafter, referred to as an 'item'), but the items may be frequently used by owners of other stored products regardless of an owner's will.

In addition, when the stored product is left unattended for a long time, it is difficult to dispose of the stored product because the owner does not approve the disposal despite a need for the disposal.

Therefore, there is a need to provide a refrigerator that may be efficiently used by a plurality of users, a shared refrigerator system, and a method for controlling the same.

DISCLOSURE

Technical Problem

The present disclosure is to solve the problem of the conventional refrigerator.

The present disclosure is to provide a refrigerator, a shared refrigerator system, and a method for controlling the same in which reliability may be realized among users in use of the plurality of users.

The present disclosure is to provide a refrigerator, a shared refrigerator system, and a method for controlling the same that may recognize users and recognize items of the users in a distinguished manner.

The present disclosure is to provide a refrigerator, a shared refrigerator system, and a method for controlling the same that may easily set or change an owner, a sharer, and an authorized disposer for an item.

The present disclosure is to provide a refrigerator, a shared refrigerator system, and a method for controlling the same that may prevent use of an item by an unauthorized person in advance by granting a function of notification for the use of the item by the unauthorized person.

Technical Solutions

In order to implement the above-mentioned purpose, according to one embodiment of the present disclosure, there is provided a refrigerator including a casing for defining a storage chamber therein, a door disposed on the casing to open and close the storage chamber, authentication means disposed on the casing or the door to recognize an individual who opens and closes the door, a camera module for photographing an interior of the storage chamber to recognize an item disposed inside the storage chamber, and a controller that establishes an ownership relationship between the item recognized via the camera module and the individual recognized via the authentication means, a shared refrigerator system, and a method for controlling the same.

It is preferable that the camera module takes an image of the interior of the storage chamber after the door is closed after being opened to recognize a change in the stored item. A change in the item may be recognized by comparing an existing image with a current image.

It is preferable that the controller matches an owner and a user to an item. Such matching information may be built with a database. When necessary, the matching information such as an item list may be transmitted to an external terminal.

The refrigerator may further include a communication module for communicating with an external terminal, and, when an owner and a user of the item do not match with each other, the controller may notify the mismatch to an external terminal of the owner via the communication module. Accordingly, the owner of the corresponding item may identify who has used his or her item.

In one example, when unauthorized use of the corresponding item occurs, the refrigerator may recognize by whom the unauthorized use was done. In addition, the refrigerator may recognize whose item the corresponding item belongs to. In this regard, an unauthorized user may also be an authenticated user of the refrigerator. Accordingly, the refrigerator may notify an external terminal of the unauthorized user that the unauthorized use of the corresponding item by the unauthorized user has been notified to the owner of the item.

That is, the controller may notify information of the corresponding item and the user to the external terminal of the owner when notifying the mismatch and may also notify to an external terminal of the unauthorized user.

The controller may receive owner change or sharer addition information of the item from the external terminal of the owner, and match a changed owner or a sharer to the item. That is, item information may be updated and the updated item information may be stored.

The controller may receive authority request information for the item from an external terminal of a person who requested an authority and authority approval information from the external terminal of the owner of the item, and match the person to the item. That is, the item information may be updated and the updated item information may be stored.

The storage chamber may have a weight sensor for sensing a weight of the item.

It is preferable that the controller matches the item with the weight of the item based on a change in weight sensed by the weight sensor. Such a weight sensor may be for recognizing whether an item whose content may have be partially used.

In order to implement the above-mentioned purpose, according to one embodiment of the present disclosure, there is provided a method for controlling a refrigerator including a recognition operation of recognizing, via authentication means, an individual who opens and closes a door, an image taking operation of taking an image, via a camera module, an interior of the storage chamber to recognize a type and a quantity of an item disposed inside the storage chamber, a matching operation of generating matching information by establishing an ownership relationship by matching the item recognized via the camera module with the individual recognized via the authentication means, and a notification operation of notifying mismatch to an external terminal of an owner of the item when the mismatch occurs in the matching information.

It is preferable that the notification operation is performed when existing matching information and current matching information do not match with each other in the matching operation.

The method may further include receiving a request for the matching information from an external terminal, and transmitting the matching information to the external terminal. The user may identify the matching information or an item list on the external terminal.

The method may further include another matching operation of receiving owner change or sharer addition information of the item from the external terminal of the owner, and matching a changed owner or a sharer to the item. That is, the item list may be updated by reflecting an active intention of the owner or the like.

The method may further include another matching operation of receiving authority request information for the item from an external terminal of a person who requested an authority, receiving authority approval information from the external terminal of the owner of the item, and matching the person to the item.

Authority rejection information may be received from the external terminal of the owner of the item, and the authority rejection information may be notified to the external terminal of the person who requested the authority.

In order to implement the above-mentioned purpose, according to one embodiment of the present disclosure, there is provided a method for controlling a shared refrigerator system including a shared refrigerator used by a plurality of users and external terminals respectively owned by the plurality of users including a matching operation of generating, by the shared refrigerator, matching information by matching an item with an owner via item recognition and user recognition, a notification operation of notifying, by the shared refrigerator, mismatch to an external terminal of the owner of the item when the mismatch occurs on the matching information, and a display operation of receiving, by the external terminal, the mismatch from the shared refrigerator, and displaying the mismatch.

The display operation may include making, by the external terminal, a request for the matching information to the refrigerator and receiving the matching information from the refrigerator to display the matching information.

The method may further include another matching operation of receiving, by the refrigerator, owner change or sharer addition information of the item from the external terminal of the owner, and matching a changed owner or a sharer to the item.

The method may further include another matching operation of receiving, by the refrigerator, authority request information for the item from an external terminal of a person who requested an authority, receiving authority approval information from the external terminal of the owner of the item, and matching the person to the item.

Authority rejection information may be received from the external terminal of the owner of the item, and the authority rejection information may be notified to the external terminal of the person who requested the authority.

Advantageous Effects

According to one embodiment of the present disclosure, it is possible to provide the refrigerator, the shared refrigerator system, and the method for controlling the same in which the reliability may be realized among the plurality of users.

According to one embodiment of the present disclosure, it is possible to provide the refrigerator, the shared refrigerator system, and the method for controlling the same that may recognize the users and recognize the items of the users in the distinguished manner.

According to one embodiment of the present disclosure, it is possible to provide the refrigerator, the shared refrigerator system, and the method for controlling the same that may easily set or change the owner, the sharer, and the authorized disposer for the item.

According to one embodiment of the present disclosure, it is possible to provide the refrigerator, the shared refrigerator system, and the method for controlling the same that may prevent the use of the item by the unauthorized person in advance by granting the function of the notification for the use of the item by the unauthorized person.

DESCRIPTION OF DRAWINGS

FIG. 5 shows an example of matching information for items.

FIG. 9 shows a control flow for performing owner change/sharer change for an item.

FIG. 10 shows a control flow for performing an authorized user request/change for an item.

BEST MODE

Hereinafter, a refrigerator according to an embodiment of the present disclosure will be described in detail with reference to the accompanying drawings.

The refrigerator according to the present embodiment relates to a shared refrigerator used by a plurality of users. Basic shape and function of the refrigerator may be the same as or similar to those of a regular refrigerator.

Figure 1:
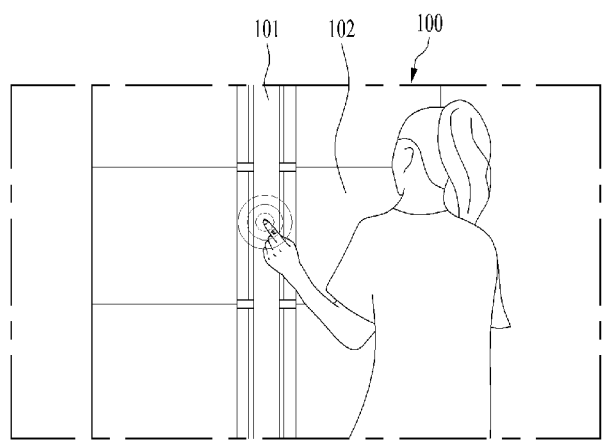
FIG. 1 schematically shows a state in which a user is authenticated by a refrigerator according to an embodiment of the present disclosure.
Figure 2:
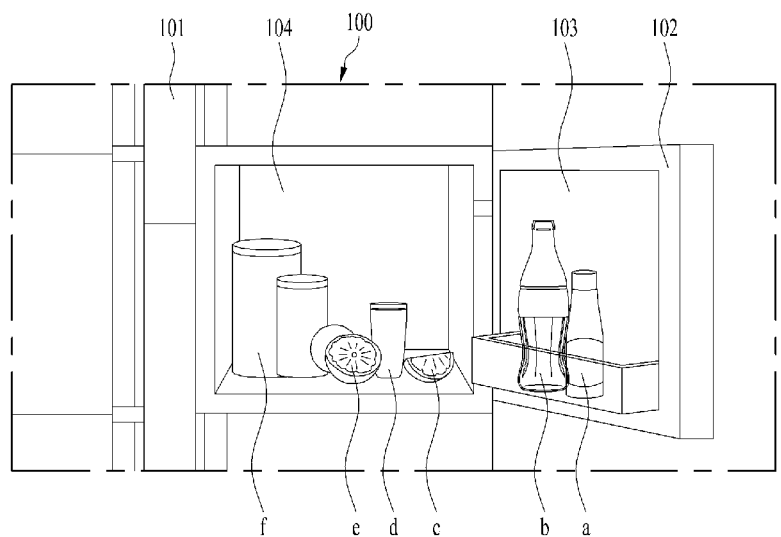
FIG. 2 schematically shows a plurality of items accommodated in a storage chamber of the refrigerator shown in FIG. 1.

As shown in FIGS. 1 and 2, a refrigerator 100 may include a casing 101 that forms an outer shape of the refrigerator 100, a storage chamber 104 defined inside the casing, and a door 102 that opens and closes the storage chamber. One door 102 may correspond to one storage chamber 104, and a separate storage space 103 may be defined in a rear surface of the door 102. Both the storage chamber 104 and the storage space 103 may be referred to as storage chambers corresponding to one door 102.

Various stored products, that is, items are disposed inside the storage chambers and such items may be distinguished from each other. That is, the plurality of items may be recognized in a distinguished manner via a camera, which will be described later. In FIG. 2, the items are denoted by a to f for convenience.

The distinguishment of the items may be for matching an owner to each item. That is, the refrigerator may distinguish which item belongs to whom. Therefore, a function for recognizing the user and a function for distinguishing the item should be mounted at the refrigerator.

Figure 3:
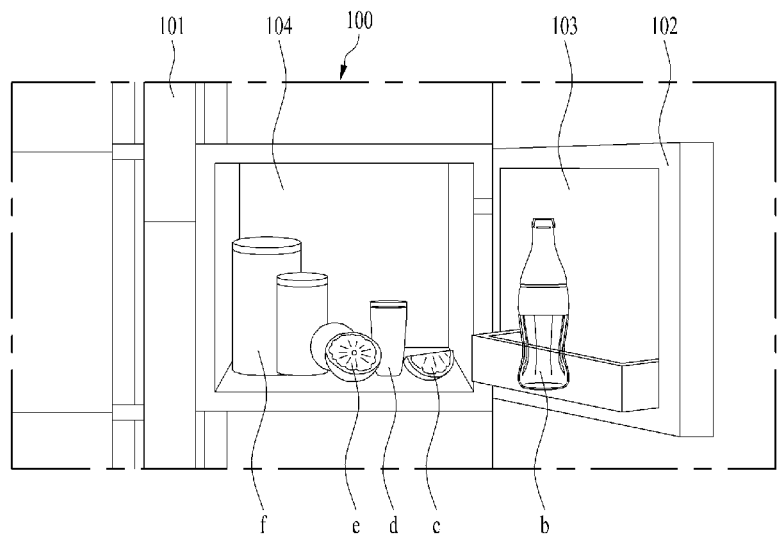
FIG. 3 schematically shows a state in which a specific item is removed from the storage chamber of the refrigerator shown in FIG. 2.

FIG. 3 shows a state in which an item a is removed and used.

Accordingly, the refrigerator should recognize which item has been newly added or which item has been removed by comparing between a state of the storage chamber shown in FIG. 2 and a state of the storage chamber shown in FIG. 3. To this end, a camera module may be installed. In addition, whose item has been added or removed should also be recognized. To this end, a user recognition sensor may be installed.

FIG. 1 shows a state of recognizing a fingerprint for user recognition. That is, a state in which a fingerprint sensor is used as an example of recognition means for recognizing the user is shown. However, methods other than the fingerprint sensor may be applied for the user recognition. When the fingerprint is used, the fingerprint sensor may be disposed on a front surface of the casing or the door, or may be disposed on a handle of the door.

For example, the camera may be disposed to photograph an individual using the refrigerator on a front surface of the refrigerator to recognize the individual. Specifically, each individual may be recognized in the distinguished manner by recognizing an iris of the individual.

As an example, a display may be disposed and personal information is inputted to recognize the individual. Each individual may have a unique ID or password, and the refrigerator may identify which user is using the refrigerator based on the inputted personal information.

Although not shown, the refrigerator may be used only by authorized specific users.

For example, when an unauthorized individual wants to use the refrigerator, a notification may be performed or the opening of the door may be denied. To this end, a door locking device (not shown) may be additionally installed.

In one example, even when a plurality of authorized users share the refrigerator, there will be an owner for each item. Accordingly, a problem in which a user other than the owner using an item of the owner may occur. Therefore, it is necessary to find a way to effectively deal with such a problem.

For the items stored in the refrigerator, not only an addition and removal of an entire item, but also a removal of a portion of the item need to be recognized. For example, a content in a bottle may be entirely used as the entire bottle is removed, however only a portion of the content may be used and the bottle returned. In one example, it is possible to recognize that only the portion of the item has been used via an image taken by the camera, but in some cases, it is difficult to recognize that only a portion of the item has been used via the image. For example, when only a portion of a content contained in a paper pack or an opaque container has been used, it may be difficult to recognize whether only a portion of the item has been used via the image.

Therefore, a weight sensor may be be installed to solve such problem.

Figure 4:
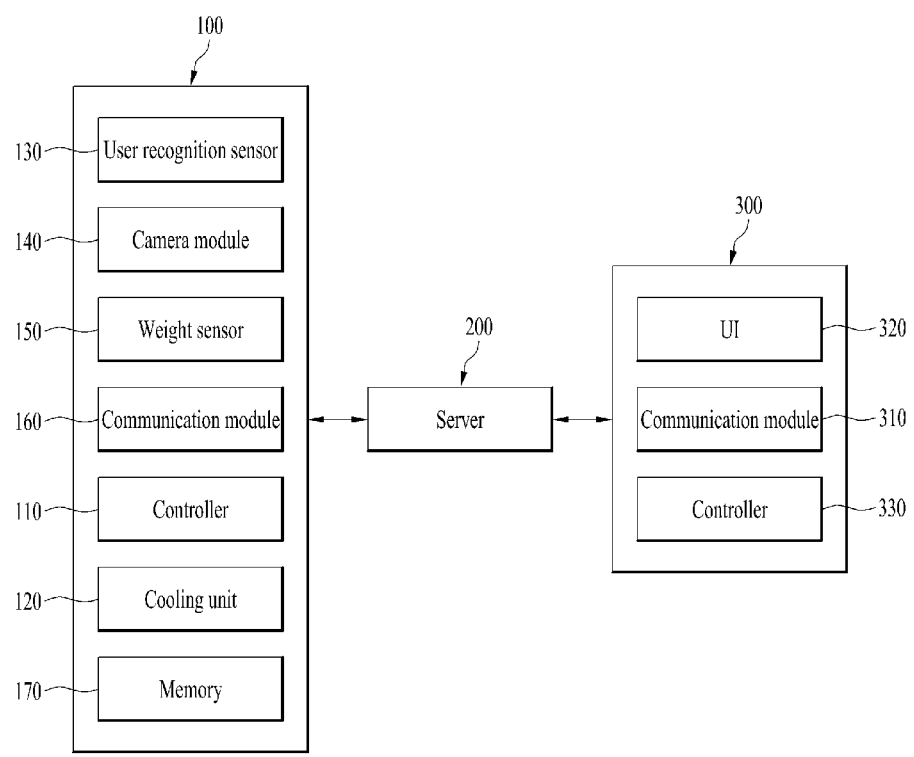
FIG. 4 is a block diagram of a refrigerator and a shared refrigerator system including the same according to an embodiment of the present disclosure.

Hereinafter, components for controlling a refrigerator and a shared refrigerator system according to an embodiment of the present disclosure will be described in detail with reference to FIG. 4.

Because the refrigerator 100 basically performs a refrigerator function, the refrigerator 100 may include a cooling unit 120, and the cooling unit 120 may be driven under control of a controller 110 such as a microprocessor. The cooling unit 120 may include various components such as a compressor, an evaporator, and a cooling fan.

The refrigerator 100 may include a camera module 140. The camera module 140 may create images of items by photographing an interior of the storage chamber. Via such images, which item each item is may be distinguished by the controller. Because many technologies for distinguishing the items via the images are commercially available, a detailed description thereof will be omitted.

The camera module 140 may be disposed to photograph an entire region of the storage chamber within one storage chamber. The camera module 140 may be implemented via one camera or may be implemented via a plurality of cameras.

Regions of the storage chamber may be distinguished via the captured image, and thus, which item is located in which region may be recognized.

A change in an item may be recognized as follows.

First, after there is an image obtained by photographing the state of the storage chamber as shown in FIG. 2, the user may remove an item a by opening the door. Then, when the door is closed, an image obtained by photographing the state of the storage chamber shown in FIG. 3 may be created. Accordingly, the controller may recognize that the item a has been removed by comparing the existing image with the new image.

In addition, when the existing image is the image shown in FIG. 3, the user may open the door and add the item a. then, when the door is closed, the image obtained by photographing the state of the storage chamber shown in FIG. 2 may be created. Accordingly, the controller may recognize that the item a has been added by comparing the existing image with the new image.

In one example, in the present embodiment, the user recognition sensor 130 that is, the recognition means may be disposed. A sensor or a controlling component for recognizing the user may be disposed. The user may be recognized via the user recognition sensor 130 and the addition of the item a may be recognized via the camera module. Accordingly, the item a may be recognized as owned by a user A, and the user A may be matched to the item a as the owner.

In addition, the user may be recognized via the user recognition sensor 130 and the removal of the item a may be recognized via the camera module. Accordingly, the controller may recognize that the item a is used by the user A. In this regard, when the user A is different from the actual owner, that is, when matching information between the item a and the owner and matching information between the item a and the user A do not correspond with each other, a problem may occur.

Therefore, it is necessary to find a way to effectively solve such mismatch problem, which will be described later.

In one example, the refrigerator may include a communication module 160. The communication module may communicate with an external terminal or a server. As an example, the communication module may be a Wi-Fi device.

The user may own the external terminal 300, the external terminal 300 may have the communication module 160. Via the communication module, the external terminal 300 may communicate directly with the refrigerator or directly communicate with a server 200.

The external terminal 300 may communicate indirectly with the refrigerator by communicating directly with the server 200.

The external terminal 300 may be a smart phone. An application for providing various remote services such as remote control, monitoring, and remote diagnosis of the refrigerator may be installed in the external terminal. That is, the remote service may be provided as an application that is executed by a controller 330 of the external terminal 300.

The external terminal 300 may have a user interface (UI) 320 such as a touch display. The user may execute the application and use the various remote services such as the remote control, the monitoring, and the remote diagnosis of the refrigerator via the UI.

In the present embodiment, matching information of the owner for each item stored in the refrigerator and storage information (a name of the item, a storage location of the item, a weight information of the item, information on the number of items, and the like) for each item may be easily identified via the external terminal 300. That is, the refrigerator creates and stores such information. When the external terminal makes a request for such information, the refrigerator transmits such information to the external terminal.

In the present embodiment, further, information on an authorized user for each item may be identified, and various remote services such as change of a sharer or change of authorization may be provided. Details on this will be described later.

FIG. 5 shows an example of a database of item information created in a refrigerator.

The item information may include an item serial number, the item name, the number of items, the weight of the item, the storage location of item, the owner of the item, and the information on the authorized user of the item.

In this regard, the authorized user of the item may be an individual who is not the owner of the item but has the right to use the corresponding item. A request for the authorization and matters regarding the authorization will be described later.

A specific user may request entire item information shown in FIG. 5 via the external terminal and identify the information on the external terminal. In one example, the specific user may request only information on items owned by himself/herself of the entire item information and identify the information on the external terminal. In addition, the specific user may request only information on items that the specific user is authorized to use and identify the information on the external terminal.

In one example, it may be seen, via the item information or matching information shown in FIG. 5 that an item b is currently located in the refrigerator, an owner of the item b is A, and an authorized user of the item b is B.

The owner may grant the user B the authority to use the item b owned by himself/herself via the external terminal.

Figure 6:
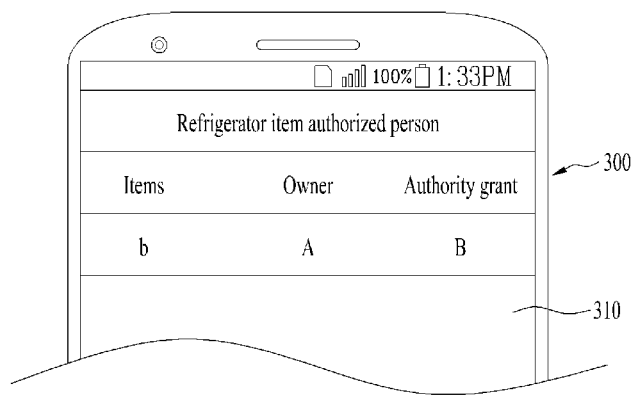
FIG. 6 shows an example in which matching information for an item is displayed on an external terminal.

As an example, the external terminal may display a screen on which the item authority grant is able to be performed. As shown in FIG. 6, with respect to the item b whose owner is A, the authority to use the item b may be granted to B, who is the new authorized person. On the corresponding screen, that is, on a corresponding screen of an external terminal of the owner A, the owner A may select the user B to grant the authority by touching a portion of 'authority grant'. Therefore, when the authority grant is performed via the screen shown in FIG. 6, the refrigerator may receive the same and update the matching information shown in FIG. 5. As an example, the item information may be updated by adding the user B into the portion of 'authority grant' with respect to the item b, which was previously blank.

In one example, as shown in FIGS. 5 and 6, currently, with respect to the item b, the owner may be A and the authorized person may be B, and a user C, who is not the owner and is not the authorized person, may use the item b without authorization.

As an example, there may be a case in which the user C removes the item b from the refrigerator. The refrigerator may recognize that the user C has used the item b via the user recognition sensor and the camera module.

In this case, the owner or the authorized person may easily identify that the item b has been used without authorization via the external terminal thereof. That is, this may be easily identified as the refrigerator transmits such content on the unauthorized use to the external terminal.

Figure 7:
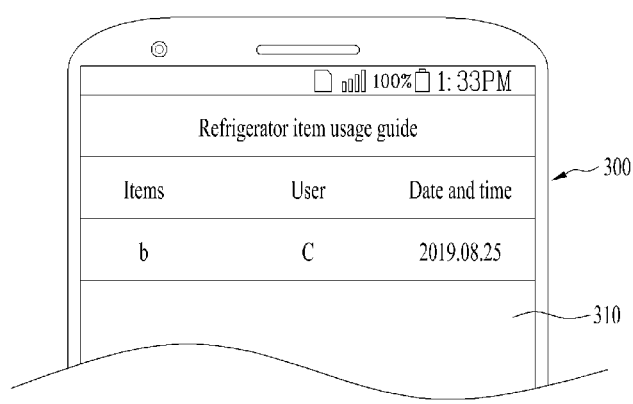
FIG. 7 shows an example in which mismatch information notified from the refrigerator is displayed on the external terminal.

FIG. 7 shows an example of a screen on which a user of an item is able to be identified. Whenever an item is added or removed, such screen may be displayed on the external terminal. However, it may be unnecessary and meaningless to identify such screen even when a person uses his/her own item.

Accordingly, the screen shown in FIG. 7 may be displayed only when it is necessary to recognize the unauthorized use of an item by a user without authority.

The owner A or the authorized person B of the item b may identify that the item b has been removed by the user C via the screen shown in FIG. 7. In addition, the owner A or the authorized person B may also identify a removal date.

Therefore, it is possible to prevent the unauthorized use of the item as much as possible via such refrigerator and shared refrigerator system, and, in the case of the unauthorized use, it is possible to take effective measures because the unauthorized user and the date and time of the unauthorized use may be easily identified.

Therefore, the refrigerator and the shared refrigerator system that all of the users may trust may be provided.

In one example, not only is it necessary for an owner of a specific item to actively grant the authority for the specific item, but also it may be necessary for another user to actively request the owner to grant the authority for the specific item.

For example, a case in which a specific item of a specific owner is left unattended for a long time and a case in which it is difficult for the specific owner to remove the specific item may occur. In this regard, a manager or another user of the refrigerator may need to remove the item that may have been spoiled in the refrigerator. Accordingly, the manager or another user may need to actively make a request for an authority to dispose of the specific item to the specific owner. Details on this will be described later.

Figure 8:
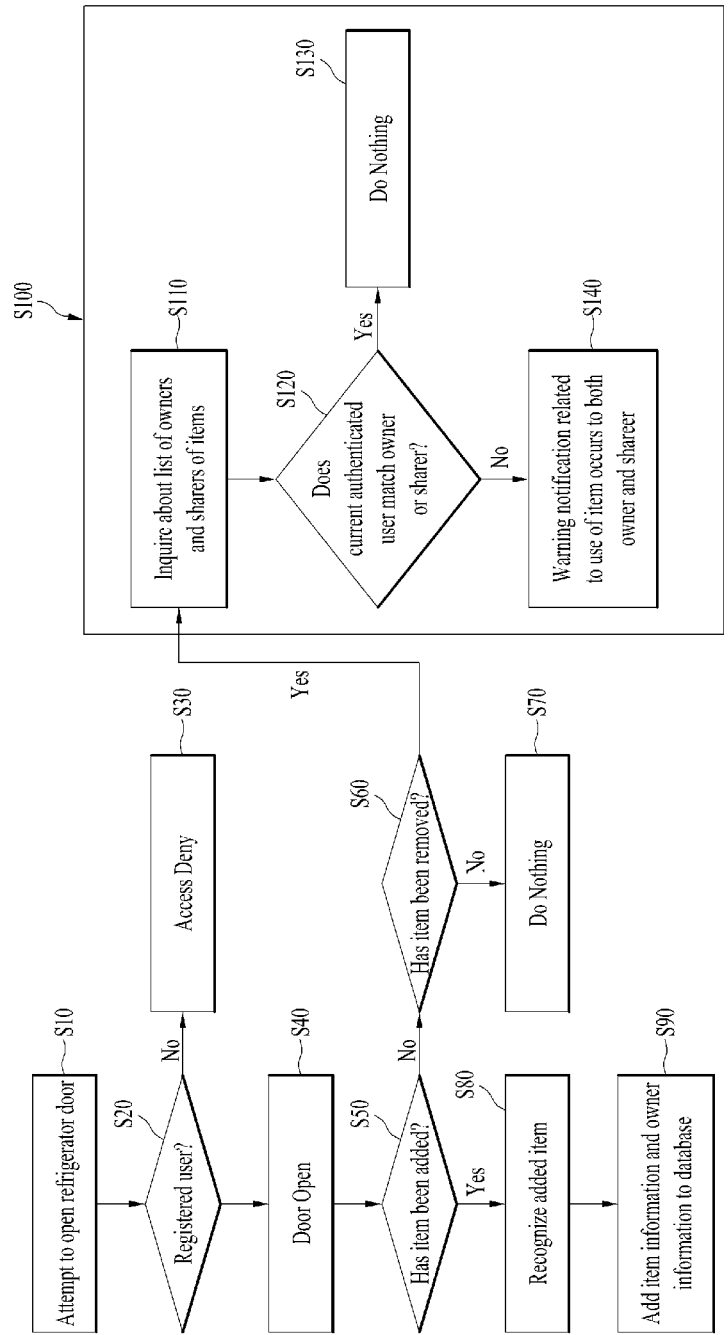
FIG. 8 shows a control flow of a refrigerator.

Hereinafter, a control flow according to an embodiment of the present disclosure will be described in detail with reference to FIG. 8.

The user accesses the refrigerator and opens the door to put an item into the refrigerator or take an item out of the refrigerator (S10).

In the refrigerator, whether the corresponding user is a registered user is determined via the user recognition sensor (S20). When the user is not a registered user, the access may not be allowed (S30). Disallowing access may be to keep the door locked such that the door does not open.

When the user is a registered user, the opening of the door may be allowed (S40), so that the user may open the door.

When terminating the use of the refrigerator, the user opens the door, then inserts or retrieves the item, and then closes the door. Therefore, when the user closes the door, the camera module creates an image by photographing the interior of the storage chamber.

Therefore, whether an item has been added (S50) and whether an item has been removed (S60) is determined by comparing the image created in advance before the use with the image newly created after the use.

As it is determined that the item has been neither added nor removed, no separate action is taken in the refrigerator (S70). For example, such situation may be a state in which the authenticated user has simply opened the door and then closed the door.

When it is determined that an item has been added, which item has been added is recognized (S80). That is, the newly added item is recognized by extracting an image of the newly added item from the new image. Artificial intelligence may be utilized to match the image with the item, and a database between the item images and the items may be constructed. In one example, the construction and expansion of such a database may be performed via a server.

In the refrigerator, a user who opened the refrigerator door immediately before the new item was added may be recognized as the owner. In addition, it may be recognized that the corresponding item belongs to the corresponding owner. That is, information matching the item with the owner is created and is added to the database.

When the opening of the refrigerator door by the user A is recognized and when it is recognized that the item a has been added after the user A closes the door, the refrigerator stores the item information by matching the item a with the user A.

In one example, an embodiment of the present disclosure may include a control flow for preventing the use of the item by the unauthorized person who is not the owner, the sharer, or an authorized disposer of the item.

As described above, the controller of the refrigerator may recognize that an item has been added or removed, and may recognize which user has added or removed the item.

In the refrigerator, a list of the corresponding items and the owners may be inquired from the current item information. That is, whether the user and the actual owner match with each other is determined (S120). When the owner and the user match with each other in the list, the refrigerator does not take any action because it is normal use of the refrigerator. In one example, information that the corresponding item has been removed will be stored (S130).

On the other hand, when the owner and the user do not match with each other in the inquired list, the owner may be notified of the occurrence of such fact (S140). Such notification may be performed not only to the actual owner, but also to the sharer or the authorized disposer of the corresponding item.

Accordingly, the owner, the sharer, or the authorized disposer of the corresponding item may easily recognize that the item has been used or removed by the unauthorized person.

The unauthorized person is also a person who has the authority to use the corresponding refrigerator, but the unauthorized person does not have the authority to use or remove the item. Therefore, it may be notified to the external terminal of the unauthorized person that the use or removal of the item by the unauthorized person has occurred and such situation is notified to the owner, the sharer, or the authorized person of the item.

Accordingly, the unauthorized person may intuitively identify that the owner or the like of the corresponding item will recognize that himself/herself has no authority. Therefore, the unauthorized use of the item by the unauthorized person may be prevented very effectively. In other words, a plurality of sharers may share the corresponding refrigerator with mutual trust.

In one example, it is desirable that transfer of ownership, setting of sharing, or transfer of disposal authority, or the like of a specific item is possible. This is because it may be necessary to prevent excessive accumulation of items because a space of the storage chamber of the refrigerator is limited. In addition, depending on the characteristics of the items stored in the refrigerator, spoilage resulting from long-term storage may be of concern. In this case, it may be necessary to remove the corresponding item from the refrigerator at an appropriate time. In addition, when a user is not able to consume fresh food such as milk thereof in a short period of time or when a user puts items belonging to another user into the refrigerator on behalf of another user, it is necessary to accurately match the actual owner with the corresponding items.

Accordingly, a method for easily and normally changing the item information or the matching information may be required.

FIG. 9 shows a control flow S200 for a user to transfer ownership of an item recorded as owned by himself/herself in a current item list, to grant a co-owned share, or to grant a disposal authority to another user. That is, the method for controlling the refrigerator and the shared refrigerator system according to the present embodiment preferably includes a control flow for making a request related to item transfer.

The user may access the refrigerator via a mobile terminal thereof (S210). An application associated with the refrigerator may be installed in the mobile terminal, and the user may access the refrigerator by executing the application using a controller. In one example, such access may be performed by direct communication between the mobile terminal and the refrigerator, and the mobile terminal may access the corresponding refrigerator via a server.

The user may request a list of items owned by himself/herself via the mobile terminal thereof and receive the list (S220). The received item list may contain detailed information of each owner and each item, and the user may inquire about the information via a UI of the mobile terminal (S230).

The user may transfer the ownership of the specific item to or share the specific item with another user on the mobile terminal. When such request is made on the mobile terminal (S240), the refrigerator reflects the request (S250). For example, when the user A transfers the ownership of the item a to B via the mobile terminal, the refrigerator may reflect such transfer and change the owner of the item a from A to B and store B as the owner of the item a. That is, it may be said that the item information or the matching information is updated. In other words, it may be said that the item and the owner (the authorized person and the sharer) are re-matched with each other.

In one example, not only is it necessary for the owner of the item to actively grant the disposal authority for the item, but it may be necessary for another user to request for the disposal authority for the item owned by the owner. For example, this is because, even when the corresponding owner fails to notice the spoiled item left unattended for a long time, the manager or another user of the refrigerator may need to recognize this and remove the spoiled item instead.

FIG. 10 shows a control flow S300 for requesting to grant a disposal authority of an item recorded as owned by another person in a current item list. That is, the method for controlling the refrigerator and the shared refrigerator system according to the present embodiment preferably includes a control flow of making a request for the item disposal authority to the owner or the like.

A person who wants to receive the disposal authority may access the refrigerator via a mobile terminal thereof (S310), inquire about the list of items (S320), and inquire about detailed information of the item for which the disposal authority is to be received (S330). Such flows may be similar to the flows shown in FIG. 9.

The person who wants to receive the disposal authority for the corresponding item may select the corresponding item from the item information and make a share request or a disposal authority request for the corresponding item. Such request may be transmitted to the mobile terminal of the owner of the corresponding item via the refrigerator (S350).

The owner of the corresponding item may approve or reject the corresponding request via the mobile terminal (S360). When the authority for the item is approved, the refrigerator may update information on the corresponding item. In one example, it may be notified to the person who requested the authority that the update has been made or that the authority for the item has been approved.

In addition, when the authority for the item is rejected, the refrigerator may notify this to the person who requested the authority.

Therefore, according to the present embodiment, it is possible to provide a refrigerator, a shared refrigerator system, and a method for controlling the same capable of providing reliability by preventing problems that may occur when the plurality of users share and use one refrigerator.

The invention claimed is:

1. A refrigerator comprising:
a casing including a storage chamber;
a door disposed at the casing to open and close the storage chamber;
an authenticator disposed at the casing or the door to recognize an individual who opens and closes the door;
a camera to take an image of an interior of the storage chamber to recognize an item disposed inside the storage chamber; and
a controller configured to establish an ownership relationship between the item recognized via the image of the camera and the individual recognized via the authenticator,
wherein the controller is configured to match an owner of the item with a user of the item.

2. The refrigerator of claim 1, wherein the camera takes an image of the interior of the storage chamber after the door is closed after being opened; and
the controller is configured to recognize a change in the item stored in the storage chamber based on a previously taken image and the taken image after the door is closed.

3. The refrigerator of claim 2, further comprising:
a communicator to communicate with an external terminal,
wherein, when the owner of the item and the user of the item do not match with each other, the controller is configured to notify the mismatch to an external terminal of the owner via the communicator.

4. The refrigerator of claim 3, wherein the controller is configured to notify information of the item and the user of the item to the external terminal of the owner when notifying the mismatch.

5. The refrigerator of claim 3, wherein the controller is configured to receive owner change or sharer addition information of the item from the external terminal of the owner, and match a changed owner or a sharer to the item.

6. The refrigerator of claim 3, wherein the controller is configured to receive authority request information for the item from an external terminal of a person who requested an authority, receive authority approval information from the external terminal of the owner of the item, and match the person to the item.

7. The refrigerator of claim 1, wherein the storage chamber includes a weight sensor to sense a weight of the item.

8. The refrigerator of claim 7, wherein the controller is configured to match the item with the weight of the item based on a change in weight sensed by the weight sensor.

9. A method for controlling a refrigerator, the method comprising:
a recognition operation of recognizing, via an authenticator, an individual who opens and closes a door;
an imaging taking operation of taking an image, by a camera, an interior of the storage chamber to recognize an item disposed inside the storage chamber;
a matching operation of generating matching information, by a controller, by establishing an ownership relationship by matching the item recognized by the camera with the individual recognized by the authenticator; and
a notification operation of notifying a mismatch, by the controller, to an external terminal of an owner of the item when the mismatch occurs in the matching information.

10. The method of claim 9, wherein the notification operation is performed when existing matching information and current matching information do not match with each other in the matching operation.

11. The method of claim 9, further comprising:
receiving, by the controller, a request for the matching information from an external terminal, and
transmitting, by the controller via a communicator, the matching information to the external terminal.

12. The method of claim 11, further comprising:
another matching operation of receiving owner change or sharer addition information of the item from the external terminal of the owner and matching a changed owner or a sharer to the item by the controller.

13. The method of claim 11, further comprising:
another matching operation of receiving authority request information for the item from an external terminal of a person who requested an authority, receiving authority approval information from the external terminal of the owner of the item, and matching the person to the item by the controller.

14. The method of claim 13, wherein when authority rejection information is received from the external terminal of the owner of the item, the authority rejection information is notified to the external terminal of the person who requested the authority.

15. A method for controlling a shared refrigerator system including a shared refrigerator used by a plurality of users and external terminals respectively owned by the plurality of users, the method comprising:
- a matching operation of generating, by the shared refrigerator, matching information by matching an item with an owner via item recognition and user recognition;
- a notification operation of notifying, by the shared refrigerator, mismatch to an external terminal of the owner of the item when the mismatch occurs on the matching information; and
- a display operation of receiving, by the external terminal of the owner, the mismatch from the shared refrigerator, and displaying the mismatch.

16. The method of claim 15, wherein the display operation includes making, by the external terminal of the owner, a request for the matching information to the refrigerator, receiving the matching information from the refrigerator, and displaying the matching information.

17. The method of claim 16, further comprising:
- another matching operation of receiving, by the refrigerator, owner change or sharer addition information of the item from the external terminal of the owner, and matching a changed owner or a sharer to the item.

18. The method of claim 16, further comprising:
- another matching operation of receiving, by the refrigerator, authority request information for the item from an external terminal of a person who requested an authority, receiving authority approval information from the external terminal of the owner of the item, and matching the person to the item.

19. The method of claim 18, wherein when authority rejection information is received from the external terminal of the owner of the item, the authority rejection information is notified to the external terminal of the person who requested the authority.

* * * * *